Oct. 11, 1927. Re. 16,766

G. E. RIBLET

VEHICLE WHEEL

Original Filed Dec. 3. 1919 2 Sheets-Sheet 1

Inventor

George E. Riblet by [illegible]

Attorney

Oct. 11, 1927. Re. 16,766

G. E. RIBLET

VEHICLE WHEEL

Original Filed Dec. 3, 1919 2 Sheets-Sheet 2

Inventor
George E. Riblet
by [illegible]
Attorney

Reissued Oct. 11, 1927. Re. 16,766

UNITED STATES PATENT OFFICE.

GEORGE E. RIBLET, OF ERIE, PENNSYLVANIA.

VEHICLE WHEEL.

Original No. 1,414,043, dated April 25, 1922, Serial No. 342,251, filed December 3, 1919. Application for reissue filed October 11, 1922. Serial No. 593,910.

This invention relates to separable pressed steel wheels and is more particularly directed to wheels of this character which are especially adapted for use on automobiles and aeroplanes.

The object of the invention is to produce a wheel structure in which the several components may be readily disassembled and replaced and in which the wheel rim has a positive driving connection with the body of the wheel.

A further object is to provide a wheel combining a rim and opposed circular dished body members having contractile peripheral portions adapted to readily engage the rim and to be expanded to clampingly engage the rim.

Another object is to so construct the body members as to permit their proper engagement with the rim without distortion and without the necessity of being sprung or forced into place.

Various other objects including those of simplicity, strength, lightness of construction and cheapness of manufacture will be more fully apparent from the following description of the accompanying drawings which form a part of this disclosure and which illustrate a preferred form of embodiment of the invention.

Figure 1:
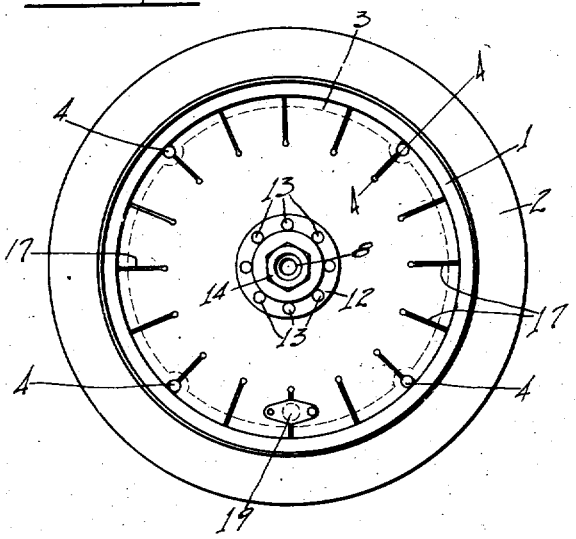
Fig. 1 is a side elevation of my improved wheel structure as utilized for an automobile or aeroplane wheel.
Figure 2:
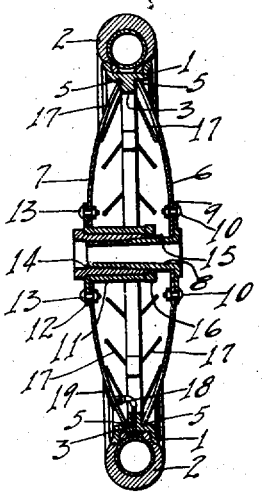
Fig. 2 is a central transverse section.
Figure 3:
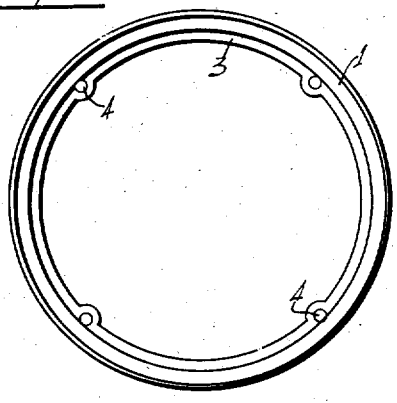
Fig. 3 is a side elevation of the rim member.
Figure 4:
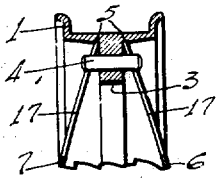
Fig. 4 is a detailed section on the line $x^4$—$x^4$ of Fig. 1.

Referring to Figs. 1 to 4, the rim 1 of the wheel has a peripheral channel adapted to receive the tire 2, and a medial rib 3 which carries a plurality of driving studs 4. Said studs are rigidly secured in the rib 3, in the present instance by having a drive fit in their receiving orifices in the rim and being pressed or driven into place, and project on opposite sides of the rib. (See Fig. 4.)

On either side of the rib 3, at the juncture of said rib with the rim 1, there are formed grooves 5—5 for receiving the peripheral edges of the side members of the wheel, as will later be explained.

The side members of the wheel are formed preferably of sheet steel and comprise dished circular disks 6—7 which together with their complementary hub elements, as separate units, are each removable with respect to the rim 1 and to the opposed side member. The disk 6 has a medial aperture adapted to receive a flanged bearing hub 8 with the flange 9 thereof secured to the disk by bolts 10. The disk 7 also has a medial orifice to receive a flanged sleeve 11 which extends inwardly with its flange 12 secured to the disk by bolts 13. A revolvable sleeve 14 has a peripheral shoulder at one end and at the opposite end has a screw threaded portion 15 of reduced diameter.

The sleeve 14 is rotatable within the flanged sleeve 11 of the disk 7 with the sleeve 11 positioned to engage the shoulder of the sleeve 14 and retained in position by a collar or nut 16 which is screw-threaded on the inner end of the sleeve 14.

A portion of the inner periphery of the sleeve 14 and a portion of the outer periphery of the hub 8 are threaded for co-operative engagement and the outer end of the sleeve 14 is contoured to receive a wrench or other tool suitable for rotating said sleeve. (See Fig. 1.)

Each disk 6—7 is provided with a series of radial slots 17 extending inwardly from its peripheral edge and dividing the peripheral portions of the disk into a plurality of transversely flexible segments. Certain of these slots are enlarged at the periphery of the disks for engagement with the driving studs 4 of the wheel rim.

Before the disks are assembled with the rim, their peripheral segmental portions are contracted, by the inherent tension of the metal, with the slots 17 nearly closed at the periphery of the disks, providing disks of minimum diameter for assembling with the rim without distortion.

The rim 1 has a radial aperture to accommodate an air valve 18 of the tire 2 and one of the disks is apertured to afford access to said valve, said aperture being normally closed by a cover plate 19. The engagement of the notches at the ends of the slits with the studs 4 locate the disks so as to bring the aperture into register with the air valve 18.

In assembling the several components of the wheel, the two side or disk members are brought together from opposite sides of the wheel rim with the bearing hub 8 of the disk 6 engaging into the revolvable sleeve 14 of the disk 7 and the peripheral edges of both disks engaging their respective grooves 5—5 of the wheel rim. By reason of the normal contracted condition of the peripheral portion of the disks, their edges can readily be engaged with their companion grooves of the rim without initial distortion of the disks and without the use of tools.

To clamp the parts together, the revolvable sleeve 14 is screwed upon the bearing hub 8, drawing the medial portions of the opposed disks together and expanding the peripheral portions of the disks to clampingly engage into the grooves 5—5 of the rim 1. This clamping action is assured by the fact that there is no axial limitation to the movement of the sleeve 14 except the engagement of the peripheries of the disks with the rim 1, the full force of the axial contracting movement of the sleeve 14 being thus effected to exert clamping action between the disks and rim.

This structure provides disks or side members having contractile peripheral portions and provides also a quick demountable wheel having positive driving connection between the rim and hub.

Figure 5:
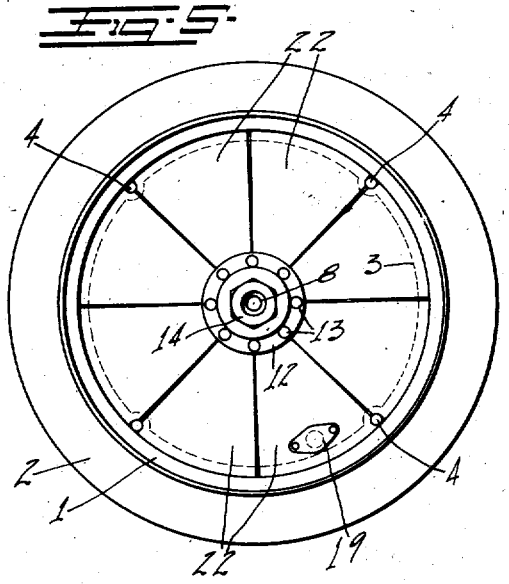
Fig. 5 is a side elevation of a wheel having a modified form of side or body member.
Figure 6:
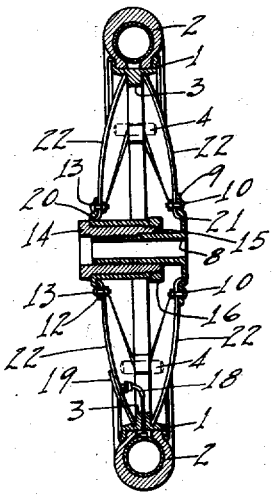
Fig. 6 is a central transverse section through the wheel shown in Fig. 5.
Figure 7:
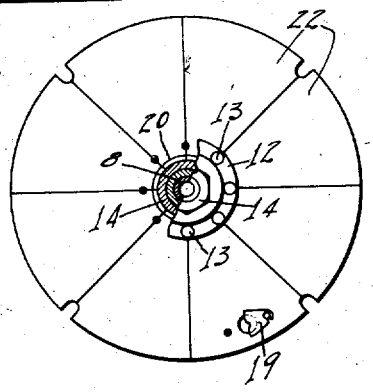
Fig. 7 is a detailed elevation of the modified form of side member, detached from the rim.

In the modified form illustrated in Figs. 5 to 7, the rim is of the same construction as that shown in Figs. 1 to 4, and the hub elements have only a slight change in contour to provide annular shoulders 20—21 affording an anchorage for the side members. The side members, in this instance, are formed of a plurality of segmental plates 22 having outwardly flanged inner ends contoured to engage beneath the shoulders 20—21. (See Fig. 6.)

The plates are contoured to form complete circular disk members, the adjacent edges forming radial slots, with certain edges notched to provide for the engagement with the driving studs of the rim.

Near their inner ends the plates have opposed notches forming orifices for the accommodation of the bolts 10—13.

When the revolvable sleeve 14 is operated releasing the side discs 6 and 7 these side discs contract and assume a deeper dish-shaped form. This contraction closes the radial slots 17 so that the walls of the slots are in contact as shown in Fig. 7. This gives to the outer periphery of the discs a minimum diameter for easy assembling with the rim.

Figure 8:
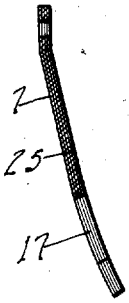
Fig. 8 is a partial sectional view of a laminated side member formed of a plurality of relatively thin sheet metal members.

The side member illustrated in Fig. 8 is formed of a plurality of relatively thin sheet metal laminations 25. This construction enables a variation to be made in the strength of the wheel, it being possible, when a wheel of greater strength is required, to assemble a greater number of laminations in the structure and reversely, when it is desired to produce a wheel of lesser strength and greater inherent resiliency a lesser number of laminations will be incorporated therein.

Where the side members are formed of sheet metal, as in the preferred form, the slits break the sound board effect of the disks. This is an important feature in devices of this type.

What I claim as new is:—

1. A vehicle wheel combining a rim having a plurality of transverse driving studs, opposed circular side members having radially disposed peripheral slots dividing the peripheral portions of the side members into segments adapted to engage the rim, certain of said slots being enlarged for engagement with the driving studs, and means operable to draw the side members together to flex the segments to clamping engagement with the rim.

2. A vehicle wheel combining a rim having a plurality of transverse driving studs and opposed internal annular grooves, opposed circular side members expansible to engage the grooves and notched for engagement with the driving studs, a fixed bearing hub carried by one side member, and a revolvable sleeve carried by the opposite member and cooperating with the bearing hub to expand the side members to clampingly engage the rim within the annular grooves.

3. A vehicle wheel combining a rim having an internal annular medial rib and a plurality of transverse driving studs, opposed circular side members positioned respectively on opposite sides of said rib with their peripheral edges seated at the juncture of said rib and rim, the side members having peripheral notches engaging the studs, a stationary hub member projected inwardly from one side member, and a revolvable member journaled in and projected inwardly from the opposite side member and cooperating with the stationary hub member to draw the side members together to clampingly engage their peripheral edges with the rim.

4. A vehicle wheel combining a rim having a transverse driving stud; opposed circular side members having expansible peripheries and a slot adapted to engage the stud; and means operable on the centers of said side members to opposingly flex them and expand the peripheries into engagement with the rim.

5. A vehicle wheel combining a rim having transverse driving studs; circular dish-shaped side members opposingly placed with their concave sides toward each other and having a slot adapted to engage the studs; and means operable to draw the medial portions of the side members together to flex said side members into clamping engagement with the rim.

6. A vehicle wheel combining a rim having a transverse driving stud and opposed internal annular grooves; opposed circular side members expansible to engage the grooves; a notch to engage the driving stud; and means operable to draw the side members together to flex the segments to clamping engagement with the rim.

7. A vehicle wheel combining a rim having a transverse driving stud; opposed side members, each comprising a stationary hub member and peripherally notched to engage said stud; and a revolvable sleeve journaled in one hub member and cooperating with the opposite hub member to force the peripheral edges of the side members into clamping engagement with the rim.

8. In a vehicle wheel, the combination of a rim; expansible side members adapted to be expanded into engagement with said rim, said side members having fixed hub members thereon with overlapping sleeves; and an interposed sleeve between the overlapping sleeves, rotatively mounted with relation to one of the hub sleeves and screw-threaded with relation to the other for moving the side members axially to expand the peripheries.

9. A vehicle wheel combining a rim; dish-shaped circular expansible side members adapted to engage said rim as the peripheries are expanded; and means for moving the centers of the members axially to expand the peripheries and clamp the same into engagement with the rim, the engagement of the side members with the rim as the peripheries are expanded forming a stop limiting the action of the means.

10. A vehicle wheel combining a rim having a transverse stud; an inflation tube extending through the rim; expansible side members adapted to clampingly engage the rim, one of the side members having an opening for an inflation tube; and a notch adapted to engage the stud, said notch bringing the opening into register with the tube; and detachable means for moving the medial portions of the side members axially to expand the peripheries into clamping engagement with the rim.

11. A vehicle wheel combining a rim; a hub; slitted and dished side members of sheet metal opposingly placed; and means for securing the side members to the rim and hub, said means being adapted to put the side members under initial tension.

In testimony whereof I have hereunto set my hand.

GEORGE E. RIBLET.